(12) United States Patent
Koike

(10) Patent No.: US 7,731,285 B2
(45) Date of Patent: Jun. 8, 2010

(54) ARRANGEMENT FOR RETAINING CRANK ELEMENT IN AUTOMOTIVE SEAT

(75) Inventor: Atsushi Koike, Tokyo (JP)

(73) Assignee: Tachi-S Co., Ltd., Tokyo (JP)

( * ) Notice: Subject to any disclaimer, the term of this patent is extended or adjusted under 35 U.S.C. 154(b) by 0 days.

(21) Appl. No.: 12/173,669

(22) Filed: Jul. 15, 2008

(65) Prior Publication Data

US 2010/0013283 A1   Jan. 21, 2010

(51) Int. Cl.
 *A47C 7/46* (2006.01)
(52) U.S. Cl. .............................. 297/284.4; 297/284.1
(58) Field of Classification Search .............. 297/284.4, 297/284.1
See application file for complete search history.

(56) References Cited

U.S. PATENT DOCUMENTS

| | | | | |
|---|---|---|---|---|
| 3,642,319 A | * | 2/1972 | Berchicci | 297/284.4 |
| 3,807,794 A | * | 4/1974 | Beyer | 297/284.4 |
| 3,890,000 A | * | 6/1975 | Easley | 297/284.4 |
| 3,973,797 A | * | 8/1976 | Obermeier et al. | 297/284.4 |
| 4,295,681 A | * | 10/1981 | Gregory | 297/284.4 |
| 4,550,949 A | * | 11/1985 | Sakamoto | 297/284.1 |
| 4,564,235 A | * | 1/1986 | Hatsutta et al. | 297/284.4 |
| 4,725,095 A | * | 2/1988 | Benson et al. | 297/284.1 |
| 4,886,316 A | * | 12/1989 | Suzuyama et al. | 297/284.4 |
| 4,896,918 A | * | 1/1990 | Hoshihara | 297/284.4 |
| 5,007,677 A | * | 4/1991 | Ozawa et al. | 297/284.4 |
| 5,087,098 A | * | 2/1992 | Ishizuka | 297/284.4 |
| 5,174,629 A | * | 12/1992 | Mizushima | 297/284.4 |
| 5,286,087 A | * | 2/1994 | Elton | 297/284.1 X |
| 5,302,002 A | * | 4/1994 | Nagasaka | 297/284.4 |
| 5,318,341 A | * | 6/1994 | Griswold et al. | 297/284.4 X |
| 5,352,018 A | * | 10/1994 | Arakawa et al. | 297/284.4 |
| 5,403,069 A | * | 4/1995 | Inara et al. | 297/284.4 |
| 5,423,593 A | * | 6/1995 | Nagashima | 297/284.4 |
| 5,588,703 A | * | 12/1996 | Itou | 297/284.4 |
| 6,769,737 B2 | * | 8/2004 | Choi | 297/284.4 X |
| 7,284,800 B2 | * | 10/2007 | Ishizuka | 297/452.18 |
| 7,347,495 B2 | * | 3/2008 | Beyer et al. | 297/284.4 X |
| 7,484,802 B2 | * | 2/2009 | Beyer et al. | 297/284.4 X |
| 2003/0085600 A1 | * | 5/2003 | Mori | 297/284.4 |

FOREIGN PATENT DOCUMENTS

| | | | | | |
|---|---|---|---|---|---|
| DE | 3616155 A1 | * | 11/1987 | | 297/284.4 |
| GB | 2196530 A | * | 5/1988 | | 297/284.4 |
| JP | 06165718 A | * | 6/1994 | | 297/284.4 |
| JP | 06217846 A | * | 8/1994 | | 297/284.4 |
| JP | 10-138812 | | 5/1998 | | |

* cited by examiner

*Primary Examiner*—Rodney B White
(74) *Attorney, Agent, or Firm*—Browdy and Neimark, PLLC

(57) ABSTRACT

A crank element is arranged rotatably between two support elements so as to prevent removal therefrom. The crank element is formed with a pair of generally inverted-L-shaped end portions each having a horizontal first end region and a vertical second end region bent from that first end region. Each of those two end portions is rotatably secured via retainer bush in each of two through-holes formed in the respective two support elements. The two through-holes each has an elongated hole region and a circular hole region. The retainer bush is resiliently deformable and has: a through-bore in which the first end region of crank element is rotatably support; and a groove portion in which the circular hole region of the through-hole is closely engaged.

5 Claims, 3 Drawing Sheets

US 7,731,285 B2

ARRANGEMENT FOR RETAINING CRANK ELEMENT IN AUTOMOTIVE SEAT

GROUND OF THE INVENTION

1. Field of the Invention

The present invention relates to a crank element rotatably journalled between a pair of support members associated with an automotive seat, the crank element being for example used as one movable mechanical part of a lumbar support device provided in automotive seat. In particular, the invention is directed to an arrangement for rotatably retaining such crank element between a pair of known support members each having a hole for allowing insertion therethrough of an end portion of the crank element.

2. Description of Prior Art

A crank element is used well in an automotive seat as a means for causing a certain motion in a required part of the seat. For example, a lumbar support device provided in a seat back of automotive seat includes a crank element rotatably secured to the lumbar support plate thereof, so that the lumber support plate may be swingingly moved via the crank element in a direction forwardly and backwardly of the seat back to a desired position for supporting a lumbar part of a seat occupant.

The conventional crank element of this kind is typically formed by: a horizontal central portion; a pair of vertical arm portions that extend by a certain angle from the respective two ends of that horizontal central portion in the same direction; and a pair of horizontal connecting end portions that extend horizontally from the respective two vertical arm portions in a direction opposite to each other. When such crank element is applied to a lumber support device, a lumbar support plate is rotatably secured to the horizontal central portion of the crank element whereas the two horizontal arm portions of the crank element are rotatably connected with a pair of support elements associated with a seat back frame.

For example, the Japanese Laid-Open Patent Publication No. 10-38812 teaches a crank element of the above-described type applied to a lumbar support device in a seat back of seat. According thereto, the crank element indeed has a pair of vertical arm portions and a pair of horizontal connecting end portions extending horizontally from those two vertical arm portions, respectively, in outward direction opposite to each other, wherein such two horizontal connecting end portions are respectively inserted in two bearing holes respectively formed in a pair of lateral frame members of seat back frame so as to project outwardly therefrom. In this prior art, a bush or E-ring is securely fitted to each of the thus-projected two connecting end portions to prevent removal of both two vertical arm portions from the seat back frame, so that the crank element is rotatably and securely connected between the two lateral frame members of seat back frame.

However, such conventional crank arrangement has been found defective in that each connecting end portion of the crank element must be formed with a shoulder portion adapted for connection with the afore-said bush nut, or formed with a circular recession adapted for engagement with the afore-said E-ring, which apparently requires a special manufacturing process entirely different from a process for forming the crank element body as well as the two arm portions thereof, thus resulting in a considerable increase of costs involved.

Further, either in connecting the bush nut with the foregoing shoulder portion of crank element or in engaging the E-ring with the foregoing circular recession of crank element, it is required for workers to use special tools and spend much time, which inevitably makes it quite time-consuming and troublesome to complete attaching the crank element to the seat back frame.

Furthermore, due to the fact that the two connecting end portions of crank element are simply inserted and received in the respective two bearing holes as stated above, a great load applied to the crank element is intensively exerted upon the bush nut or E-ring. Consequently, when an excessive great load is applied to the crank element, which may cause deformation of those connecting end portions, the bush nut or E-ring can no longer withstand such excessive load and will be broken. Hence, it is highly possible that both two connecting end portions of crank element will be removed from the respective two lateral frame members of seat back frame.

SUMMARY OF THE INVENTION

In view of the above-stated drawbacks, it is a purpose of the present invention to provide a simplified arrangement for retaining a crank element rotatably between two support elements, in an automotive seat, which insures to prevent removal of the crank element from the two support elements, while insuring to not only avoid raffling and wobbling of the crank element, but also avoid creation of unpleasant or loud noise therefrom.

In order to achieve such purpose, in accordance with the present invention, there is basically provided an arrangement for retaining a crank element rotatably between one support element and another support element in an automotive seat, in which the crank element has one end and another end, comprising:

one generally inverted-L-shaped end portion defined integrally in the afore-said one end of the crank element, such one generally inverted-L-shaped end portion being defined by bending that particular one end of said crank element in a generally inverted-L-shaped configuration so as to have, defined therein, a first end region extending horizontally from the one end of the crank element and a second end region extending at substantially a right angle from the first end region;

another generally inverted-L-shaped end potion defined integrally in the afore-said another end of said crank element, such another generally inverted-L-shaped end portion being defined by bending the foregoing another end of said crank element in a generally inverted-L-shaped configuration so as to have, defined therein, a first end region extending horizontally from the one end of said crank element and a second end region extending at substantially a right angle from the first end region;

one through-hole having an elongated hole region and a circular hole region communicating with the elongated hole region, wherein the elongated hole region has a width, whereas the circular hole region has a diameter larger than the width of the elongated hole region, wherein an entire length of the afore-said one through-hole, which corresponds to an entire length of the elongated and circular hole regions of that particular one through-hole is larger than an entire length of the first and second end regions of the afore-said one inverted-L-shaped end portion, thereby allowing those particular first and second end regions to pass through the one through-hole.

the afore-said one through-hole being formed in said one support element, such that the elongated hole region extends from the circular hole region in a first direction;

another through-hole having an elongated hole region and a circular hole region communicating with the elongated hole region, wherein the elongated hole region has a width, whereas the circular hole region has a diameter larger than the width of the elongated hole region, wherein an entire length of the afore-said another through-hole, which corresponds to an entire length of the elongated and circular hole regions of that particular another through-hole, is larger than an entire length of the first and second end regions of the afore-said another inverted-L-shaped end portion, thereby allowing those particular first and second end regions to pass through the another through-hole, such another through-hole being formed in the foregoing another support element, such that the elongated hole region extends upwardly from the circular hole region in a first direction;

one retainer bush element of a resilient property, the one retainer bush element having: a through-bore for allowing the afore-said generally inverted-L-shaped end portion to be inserted and passed therethrough; and a groove portion for allowing the circular hole region of the afore-said one through-hole to be closely engaged therein;

such one retainer bush element being disposed between the first end region of the foregoing one generally inverted-L-shaped end portion and the circular hole region of the foregoing one through-hole, in such a manner that the groove portion thereof is closely engaged with the circular hole region of the afore-said one through-hole, while allowing the first end region of one generally inverted-L-shaped end portion to be rotatable in the through-bore thereof, with the second end region of the foregoing one generally inverted-L-shaped end portion extending from the circular hole region of one through-hole in a second direction opposite to the first direction associated with the elongated hole region of such one through-hole;

another retainer bush element of a resilient property such another retainer bush element having a through-bore for allowing the foregoing generally inverted-L-shaped end portion to be inserted and passed therethrough; and a groove portion for allowing the circular hole region of another through-hole to be resiliently and closely engaged therein; and the aforesaid another retainer bush element being disposed between the first end region of the foregoing another generally inverted-L-shaped end portion and the circular hole region of the foregoing another through-hole in such a manner that the groove portion thereof is closely engaged with the circular hole region of the foregoing one through-hole while allowing the first end region of the aforesaid another generally inverted-L-shaped end portion to be rotatable in the through-bore thereof, with the second end region of the foregoing another generally inverted-L-shaped end portion extending from the circular hole region of the foregoing another through-hole in a second direction opposite to the first direction associated with the elongated hole region of the foregoing another through-hole.

Preferably, each of the afore-said one and another retainer bush elements may be so formed to have: one end portion; a cylindrical body portion having a circumferential outer surface; and at least two anchor portions, in such a manner that such at least two anchor portions are formed integrally on the circumferential outer surface of the cylindrical body portion in a spaced-apart relation with each other, while being spaced from the afore-said one end portion, thus defining at least two grooves therebetween, and that the afore-said through-bore extends through the cylindrical body portion and one end portion.

Preferably, the afore-said elongated hole region of each of the one and another through-holes may also extend in a direction different from a direction in which the first end region of each of the foregoing one and another inverted-L-shaped end portion is to be displaced by a load applied to the crank element, and further, that particular elongated hole region be disposed at a point out of a range within which the second end region of each of the afore-said one and another inverted-L-shaped end portions is to be rotated relative to a center of said circular hole region of each of said one and another through-holes.

Other various features and advantages of the present invention will become apparent from reading of the descriptions, hereinafter, with reference to the annexed drawings.

DETAILED DESCRIPTION OF PREFERRED EMBODIMENT OF THE INVENTION

Figure 1:
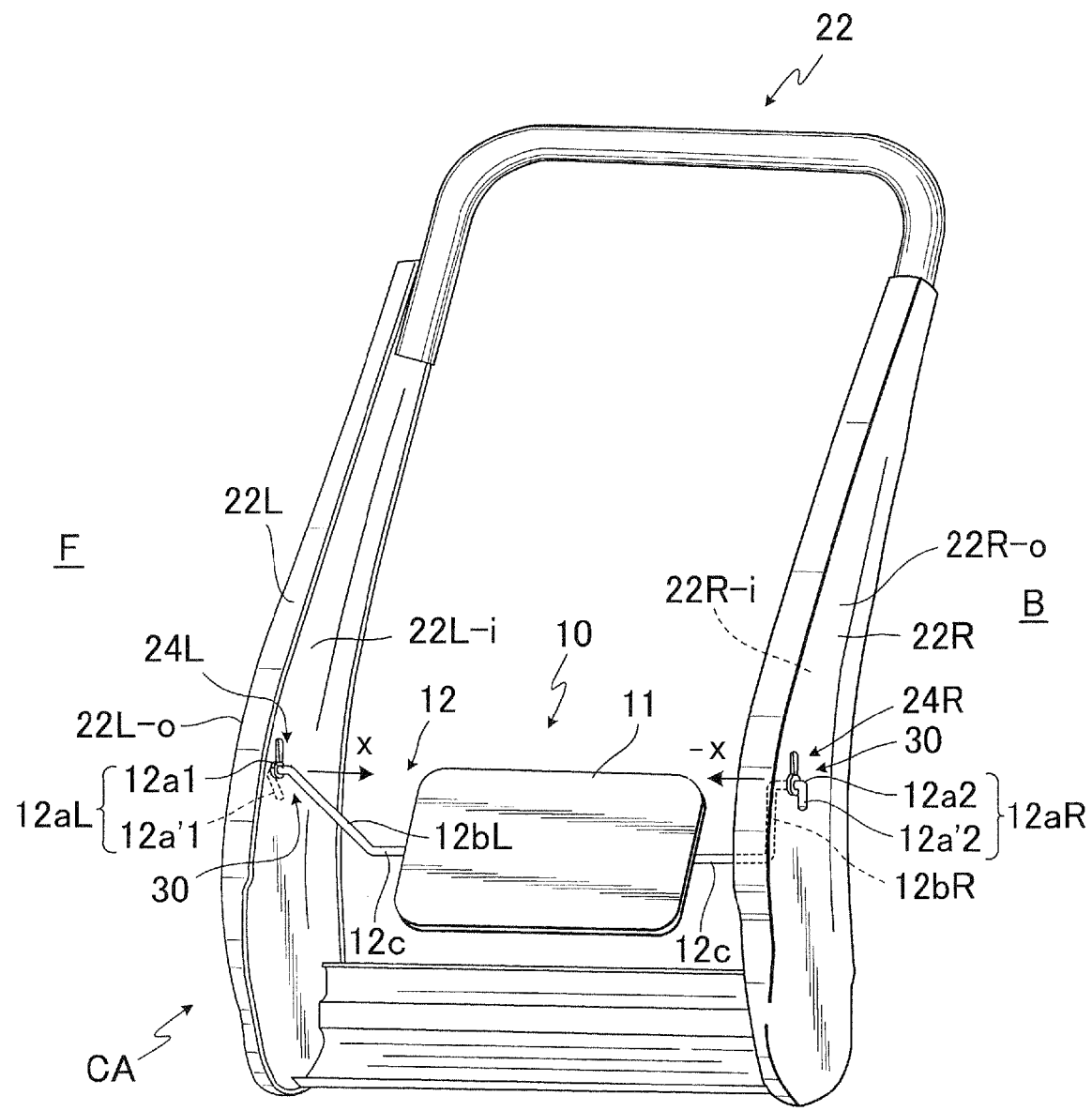
FIG. 1 is a schematic perspective view showing the state where an arrangement for retaining a crank element in the present invention is applied to a lumbar support device provided in a seat back frame of automotive seat.

Referring to FIGS. 1 through 4(B), there is illustrated one exemplary mode of arrangement for retaining a crank element in an automotive seat, in accordance with the present invention. Such crank element retaining arrangement is generally designated by (CA) and may be applied to a lumbar support device (10) by way of example, the lumbar support device (10) being provided between a pair of right and left lateral frame members (22R) and (22L) which are associated with a seat back frame (22) of automotive seat.

It is noted that, hereinafter, the term, "forward" or "forwardly," refers to a forward side (F) facing forwardly of the seat back frame (22), whereas the term, "backward" or "backwardly", refers to a backward side (B) facing backwardly of the seat back frame (22).

The lumbar support device (10) itself is known in the art, which typically comprises a lumbar support plate (11) and a crank element (at 12) pivotally connected to that lumbar support plate (11). The crank element per se may be a crank rod member (12) which is formed by bending a rigid rod material into a generally U-shaped configuration having a central portion (12c) and a pair of left and right arm portions (12bL) and (12bR), wherein such left and right arm portions (12bL) and (12bR) extend at a central angle from the respective two ends of that central portion (12c) for pivotal connection with the afore-said pair of lateral frame members (22R) and (22L). To such structural extent only, the crank-type lumbar support device (10) is known and widely used in the filed of automotive seat and therefore not the subject matter of the present invention.

In accordance with the present invention, a novel simplified arrangement (CA) is provided for retaining a crank element to the seat back frame (22), wherein such crank element corresponds to the crank rod member (12) as far as the present embodiment is concerned.

A specific description will now be made of such crank element retaining arrangement (CA) in the case where it is applied to the lumbar support device (10). In this regard, it is noted again that the arrangement (CA) is not limited to a crank element of the lumbar support device (at 10), but may be applied to any other sort of device or mechanism provided with the crank element, in association with automotive seat.

In brief, the crank element retaining arrangement (CA) is basically characterized by formation of a generally "key hole" shaped through-hole in each of the left and right lateral frame members (22L) and (22R) and also by integral formation of generally inverted-L-shaped end region in the distal end of each of the left and right arm portions (12bL) and (12bR) of the crank element or the crank rod member (12). Basically, the left arm portion (12bL) and left through-hole (24L) are identical in shape and size to the right arm portion (12bR) and right through-hole (24R), respectively.

According to the illustrative embodiment, the left arm portion (12bL) of crank rod member (12) is shown in FIG. 1 as being formed integrally with a generally inverted-L-shaped connecting end portion (12aL) in the distal end thereof.

Figure 2:
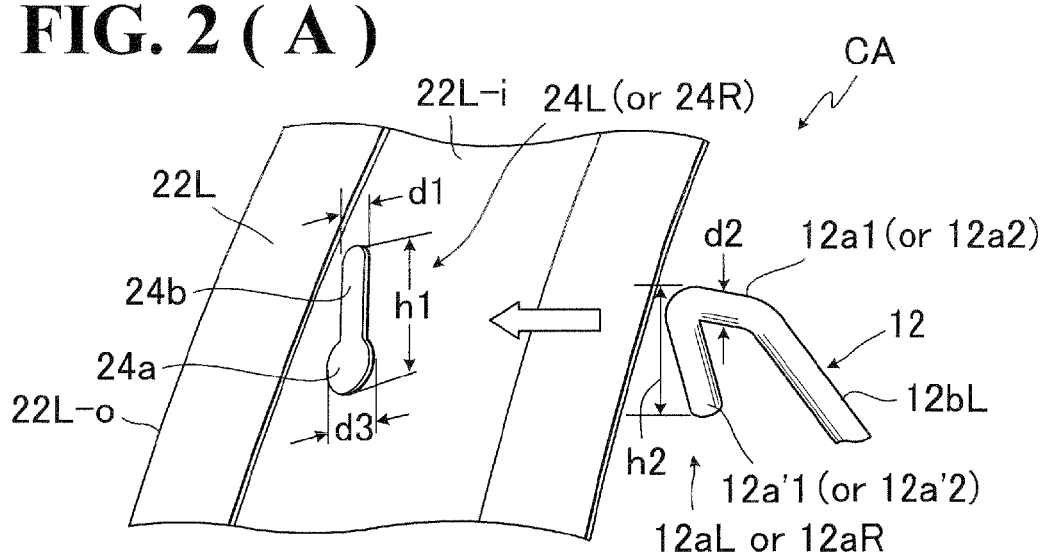
FIGS. 2 (A), 2(B) and 2(C) are diagrams for explanatorily showing how a generally inverted-L-shaped end portion of the crank element is connected with a through-hole formed in a lateral frame member of the seat back frame by use of a retainer bush.
Figure 2:
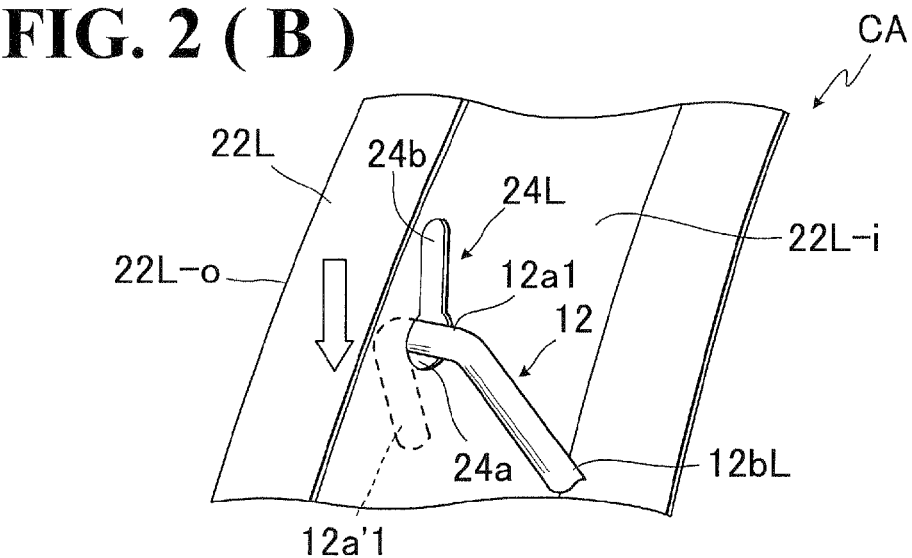
Figure 2:
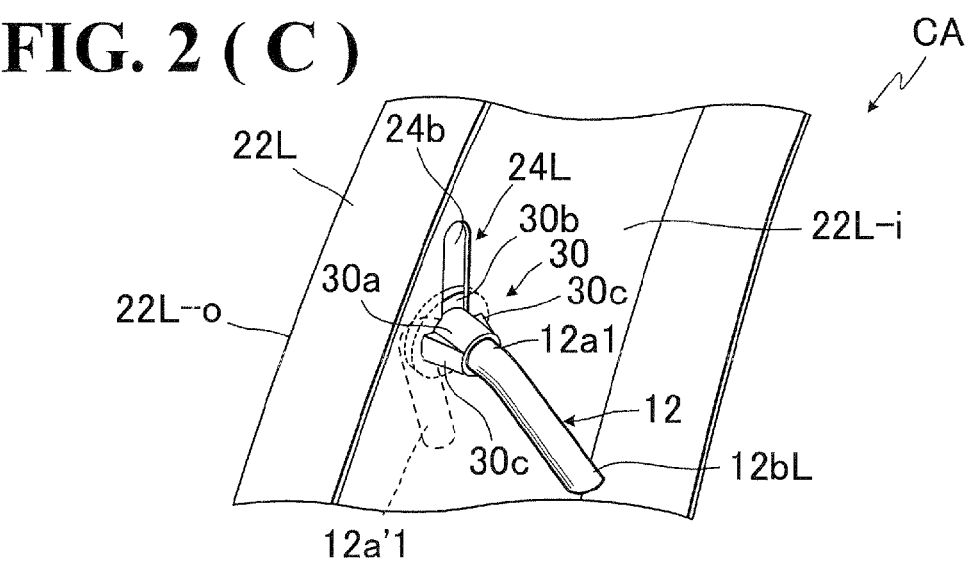

The generally inverted-L-shaped connecting end portion (12aL) is formed by a horizontally extending first connecting end region (12a1) and a downwardly extending second connecting end region (12a'1). As best seen in FIG. 2 (A), the first connecting end region (12a1) extends continuously and horizontally from the distal end of the left arm portion (12bL) in a direction outwardly of the crank rod member (12) or leftward therefrom, whereas the second connecting end region (12a'1) extends downwardly and at a right angle from the first end region (12a1), as illustrated.

On the other hand, the right arm portion (12bR) of crank rod member (12) is also shown in FIG. 1 as being formed integrally with a generally inverted-L-shaped connecting end portion (12aR) integrally in the distal end thereof. Likewise as in the foregoing left arm portion (12bR) such connecting end portion (12aR) is formed by a horizontally extending first connecting end region (12a2) and a downwardly extending second connecting end region (12a'2). More specifically, the first connecting end region (12a2) extends continuously and horizontally from the distal end of the right arm portion (12bR) in a direction outwardly or rightward of the crank rod member (12), whereas the second connecting end region (12a'2) extends downwardly and at a right angle from the first connecting end region (12a1), as illustrated.

In this context, as far as the present embodiment is concerned, a whole of the crank rod member (12), including the left and right arm portions (12bL) (12bR) as we as all the aforementioned inverted-L-shaped connecting end portions (12aL) (12aR) thereof, is formed from one and same rigid rod material which is not hollow and has a fixed uniform outer diameter over the entire length thereof. In other words, the left-side first and second connecting end regions (12a1 and 12a'1) and the right-side first and second connecting end regions (12a2 and 12a'2) are all identical in outer diameter to the left and right arm portions (12bL) (12bR), respectively.

Formation of the foregoing first connecting end regions (12a1 or 12a2) and second connecting end region (12a'1 or 12a'2) is by simply bending a corresponding predetermined end portion of the arm portion (12bL or 12bR) in the illustrated generally "inverted-L" fashion.

Reference is now made to FIG. 2(A) which shows a left through-hole (24L) formed in the left lateral frame member (22L) of seat back frame (22), the left through-hole (24L) being adapted for allowing insertion and rotatable engagement therein of the afore-said first and second connecting end regions (12a1) (12'a1) of the crank rod member's left arm portion (12b) As shown, the through-hole (24L) itself is of generally "key hole" shape having an elongated hole region (24b) and a generally circular hole region (24a) communicating with that elongated hole region (24b). This particular arrangement allows all the aforementioned first and second connecting end regions (12a1) (12a'1) to be easily inserted in the through-hole (24L) and rotatably supported in the generally circular hole region (24a), as will be elaborated later.

Of course, the same goes for a right through-hole (24R) formed in the right lateral frame member (22R), the right through-hole (24R) being also of a generally "key hole" shape and identical in shape and size to the foregoing left through-hole (24L). Namely, as understandable from FIG. 3, such right through-hole (24R) also has, defined therein, an elongated hole region (24b) and a generally circular hole region (24a). Thus, it is to be understood that the first and second end regions (12a2) and (12a'2) of this right arm portion (12bR) may be inserted in the right through-hole (24R) and rotatably supported in the generally circular hole region (24a), as will be elaborated later.

Figure 3:
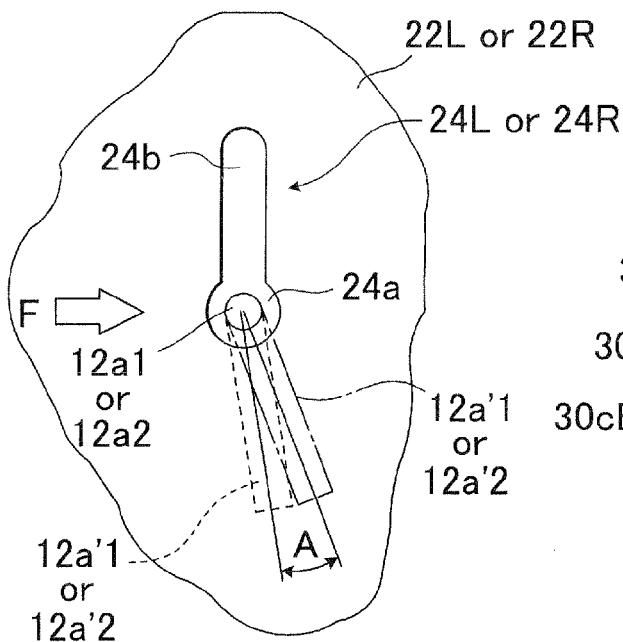
FIG. 3 is a diagram for explanatorily showing disposition of the through-hole and the generally inverted-L-shaped end portion with respect to a load applied to the crank element.

Hence, as understandable from FIGS. 2(A) and 3, for both of the left and right through-holes (24L) and (24R), it is important to note the following points:

(i) An entire length (h1) of the through-hole (24L or 24R) is larger than an entire length (h2) of the inverted-L-shaped connecting end portion (12aL or 12aR) (or the length of the second connecting end region (12a'1 or 12a'2)).

(ii) A width (d1) of the elongated hole region (24b) of the through-hole (24L or 24R) is larger than an outer diameter (d2) of the inverted-L-shaped connecting end portion (12aL or 12bL) (or the outer diameter of each of the first and second connecting end regions (12a1 and 12a'1) or (12a2 and 12a'2).

(iii) An inner diameter (d3) of the circular hole region (24a) of the through-hole (24L or 24R) is much larger than the outer diameter (d2) of the inverted-L-shaped connecting end portion (12aL or 12aR), while being substantially equal to an outer diameter (D2) of a cylindrical body portion (30a) of a retainer bush (30) to be described below.

Further, for both of the left and right through-holes (24L) and (24R), with reference to FIG. 3, it is important that the elongated hole region (24b) should be defined in the lateral frame member (22L or 22R) so as to extend in a direction intersecting a direction of a load (F) applied to the crank rod member (12) from a seat occupant (not shown) or due to a collision, and also be disposed at a point out of the rotation range (A) within which the second connecting end region (12a'1 or 12a'2) is to be rotated in the circular hole region (24a). Thus, with this arrangement, even if the load (F) is strongly applied to the crank rod member (12), the first connecting end region (12a1 or 12a2) thereof is prevented from being dislocated into the elongated hole region (24b), which means to completely avoid accidental movement of such connecting end region (12a1 or 12a2) along that elongated hole region (24b). Further, an entire elongated body of the second connecting end region (22a'1 or 22a'2) is not rotated excessively upwards to the elongated hole region (24b), because, as stated above, that elongated hole region (24b) is located far from the rotation range (A) associated with the second connecting end region (12a'1 or 12a'2). Consequently, second connecting end region (22a'1 or 22a'2) is in no way aligned with the elongated hole region (24b) and thus not removed therefrom. Those arrangements therefore insures to prevent removal of the crank rod member (12) from the two lateral frame members (22L) and (22R) of seat back frame (22).

In accordance with the present invention, as seen in FIG. 1, there are provided a pair of retainer bushes (30) and (30) which are identical in configuration and size to each other. Briefly stated, one retainer bush (30) is provided for retaining the left inverted-L-shaped connecting end portion (12aL) of the crank rod member (12) rotatably in the circular hole region (24a) of the left through-hole (24L), whereas the other retainer bush (30) is provided for retaining the right inverted-L-shaped connecting end portion (12aR) rotatably in the circular hole region (24a) of the right through-hole (24R).

Figure 4:
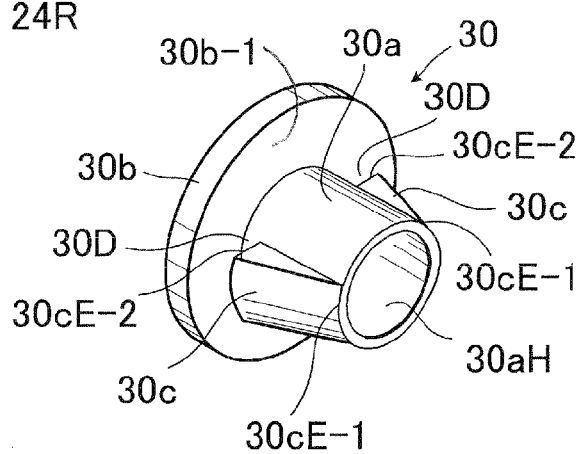
FIG. 4 is a schematic perspective view of the retainer bush.

For the sake of simplicity, one retainer bush (30) will now be described specifically, only with respect to the left arm portion (12bL) and left through-hole (24L). Specifically, as best shown in FIG. 4, the retainer bush (30) per se is so formed to have: a cylindrical body portion (30a) having a through-bore (30aH) defined therein a circular flange portion (30b) integrally formed in one end of that cylindrical body portion (30a) so as to radially extend therefrom; and a pair of wedge-like anchor portions (30c) and (30c) which are formed integrally on the outer circumferential surface of cylindrical body portion (30a).

The illustrated retainer bush (30) is formed from a synthetic resin material which is elastic but has a certain rigidity, so as to be resiliently deformable by applying a certain force thereto and can be resiliently recovered into its original shape by releasing that force therefrom To serve such purpose, the retainer bush (30) may be formed from any other suited material, such as a hard rubber material or a metallic material having a certain elasticity.

Figure 5:
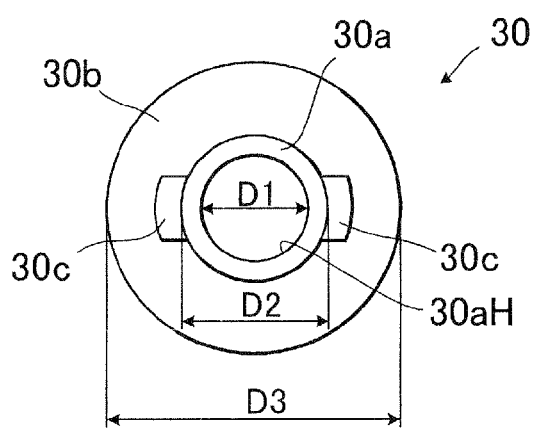
FIG. 5 is a front view of the retainer bush.

As best seen in FIG. 5, the afore-said two anchor portions (30c) and (30c) are disposed in a diametrically opposed relation with each other relative to the cylindrical body portion (30a). It is observed that each anchor portion (30c) is of a wedge shape and thus becomes divergent as it proceeds from the distal end of the body portion (30a) towards the flange portion (30b), so that the anchor portion (30c) has a sloped outer surface (30a-1) which is rounded or curved along a circumference of circle whose center is at a central axis of the cylindrical body portion (30a). Such wedge-shaped anchor portion (30c) terminates in a vertical end surface (30cE-2) at a point near to but spaced from the planar wall (30b-1) of the flange portion (30b), which in turn defines a groove (30D) between those vertical end surface (30cE-2) and planar wall (30b-1). Hence, in the shown embodiment, a pair of diametrically opposed grooves (30D) and (30D) are defined circumferentially of the cylindrical body portion (30a).

Of course, two or more anchor portions (30c) may be formed integrally on the outer circumferential surface of central cylindrical portion (30a) so as to define two or more grooves (30D) between the vertical end surface (30cE-2) and the flange portion's planar wall (30b-1). Or, alternatively, the anchor portion (30c) itself may be of a truncated-conical configuration formed integrally on whole circumferential surface of the central cylindrical portion (30a), with the vertical end surface (at 30cE-2) thereof extending continuously about that central cylindrical portion (30a), in which case, the groove (30D) will be made annular, thus extending annually between the vertical end surface (at 30cE-2) and the flange portion's planar wall (30b-1). But, it is recommended to form the two diametrically opposed anchor portions (30c) as in the present embodiment in order to make easily deformable a whole of the cylindrical body portion (30a) as well as the anchor portions (30c) themselves. This effectively facilitates the ease of attaching the bush (30) on the end regions of crank rod member arm portion (12bL or 12bR) and also inserting the bush (30) in the through-hole (24L or 24R), as will be described later.

As understandable from FIGS. 2(A) and 5, the cylindrical body portion (30a) of retainer bush (30) has an outer diameter (D2) substantially equal to an inner diameter (d3) of the circular hole region (24a), and the through-bore (30aH) of that cylindrical body portion (30a) has an inner diameter (D1) slightly larger than the outer diameter (d2) of the inverted-L-shaped connecting end portion (12aL or 12aR). On the other hand, the flange portion (30b) of retainer bush (30) is of an outer diameter (D3) much larger than the inner diameter (d3) of the circular hole region (24a), and also, both two anchor portions (30c) of retainer bush (30) project outwardly to an extent exceeding the inner diameter (d3) of the circular hole region (24a).

Now, a description will be made as to how the crank rod member (2) is connected and rotatably retained between the two lateral frame members (22L) and (22R) by use of the two retainer bushes (30) and (30).

At first, as indicated by the leftward arrow in FIG. 2(A), the first and second connecting end regions (12a1) and (12a'1) of crank rod member's left arm portion (12bL) are inserted in the left through-hole (24L), so that the second connecting end region (12a'1) only projects from the outer surface (22L-o) of the left lateral frame member (22L). At the same time, likewise, another first and second connecting end regions (12a2) and (12a'2) of crank rod member's right arm portion (12bR) are inserted in the right through-hole (24R), so that the second connecting end region (12a'2) only projects from the outer surface (22R-o) of the right lateral frame member (22R), which is understandable by taking a comparative look at FIG. 1 and FIG. 2(A) in conjunction with FIG. 3.

Then, as indicated by the downward arrow in FIG. 2(B), both first and second connecting end regions (12a1) and (12a'1) are displaced downwardly in and along the elongated hole region (24b) of the left through-hole (24), so that the first connecting end region (12a1) is positioned in the circular hole region (24a) of that left through-hole (24L) with the second connecting end region (12a'1) extending downwardly from that circular hole region (24a) At the same time, likewise, another first and second connecting end regions (12a2) and (12a'2) of the right arm portion (12R) are displaced downwardly in and along the elongated hole region (24b) of the right through-hole (24R), so that the first connecting end region (12a2) is positioned in the circular hole region (24a) of that right through-hole (24R), which is understandable by taking a comparative look at FIG. 1, FIG. 2(B) and FIG. 3.

Thereafter, the retainer bush (30) is brought to the afore-said second connecting end region (12a'1) of crank rod member (12). Then, by forcibly inserting such second connecting end region (12a'1) through the through-bore (30aH) of that retainer bush (30), a worker can move the retainer bush (30) slidingly along the second connecting end region (12a'1) to the first connecting end region (12a1) adjacent to the circular hole region (24a). By doing so, upon the retainer bush (30) reaching that first connecting end region (12a1), the worker should forcibly insert the cylindrical body portion (30a) of retainer bush (30) into the circular hole region (24a). At this moment, the two anchor portions (30c) of that retainer bush (30) are also forcibly inserted into the circular hole region (24a) such that both two tapered end portions (35cE-1) and (35cE-1) respectively thereof are first inserted in that particular circular hole region (24a). As the worker continues forcibly passing the cylindrical body portion (30a) through the circular hole region (24a), both two anchor portions (30c) are being partway resiliently depressed by the inner circular edge of the circular hole region (24a), so that the depressed local part of each anchor portion (30c), which is just depressed by the circular hole region (24a), is resiliently deformed into an arcuate layer of thin thickness substantially smaller than the inner diameter (d3) of that circular hole region (24a), thereby allowing all the cylindrical body portion (30a) and anchor portions (30c) to be bodily passed therethrough. Then, upon having been completely passed through the circular hole region (24a), both two resilient anchor portions (30c) are quickly recovered into their respective original wedge shapes at the inward surface (22L-i) of the lateral frame member (22L), while at the same time, the edge portion of the circular hole region (24a) is received fit in the two grooves (30D). This is understandable from FIGS. 2(C) and 6. It is also seen that the annular planar surface (30b-1) of the retainer bush flange portion (30b) is in close contact with the outer surface (22L-o) of the lateral frame member (22L).

All the same steps as described above are also conducted for connecting the right inverted-L-shaped connecting end portion (12aR) to the right lateral frame member (22R), such that the first connecting end region (12a2) is rotatably secured by the retainer bush (30) in the circular hole region (24a) of the right through-hole (24R), while the second connecting end region (12a'2) is disposed at the outer surface (22R-o) of the right lateral frame member (22R), as understandable from FIG. 1, FIGS. 2(A) to 2(C) and FIG. 3. In this regard, briefly stated, likewise as described above, both two anchor portions (30c) and (30c) of the retainer bush (30) are forcibly passed through the circular hole region (24a), while being resiliently depressed by the inner end of the latter, so that the two anchor portions (30c) are subsequently recovered into their respective original wedge shapes at the inward surface (22R-i) of the right lateral frame member (22R), while at the same time, the edge portion of the circular hole region (24a) is received fit in the two grooves (30D). Also, the annular planar surface (30b-i) of retainer bush flange portion (30b) is in close contact with the outer surface (22R-o) of the right lateral frame member (22R).

Accordingly, in accordance with the present invention, it is to be appreciated that the following advantages and effects are attained:

(i) Each of the two generally inverted-L-shaped connecting end portions (12aL) (12aR) can be easily formed by simply bending the end regions of the corresponding arm portion (12bL or 12bR) of known crank element (at 12). Hence, there is no need for forming any engagement area in the end of the crank element's arm portion in order for a connecting part, such as bush nut or E-ring, to be securely engaged with that engagement area, as found in the prior art.

(ii) The retainer bush (30) is made of a resilient material, such as synthetic resin or hard rubber, and has spaced-apart anchor portions (30c) which makes a whole of the retainer bush (30) easily deformable in a resilient way. Hence, when the cylindrical body portion (30a) of the bush (30) is forcibly inserted through the circular hole region (24a), the anchor portions (30c) are resiliently depressed by the inner edge of that circular hole region (24a) and thereafter resiliently recovered into their respective original wedge-like shapes, with the result that the edge portion of the circular hole region (24a) is received closely and tight in the two grooves (30D) of the retainer bush (30), while the annular planar surface (30b-1) of the retainer bush flange portion (30b) is closely contacted with the outer surface (22L-o or 22R-o) of the lateral frame member (22L or 22R).

Figure 6:
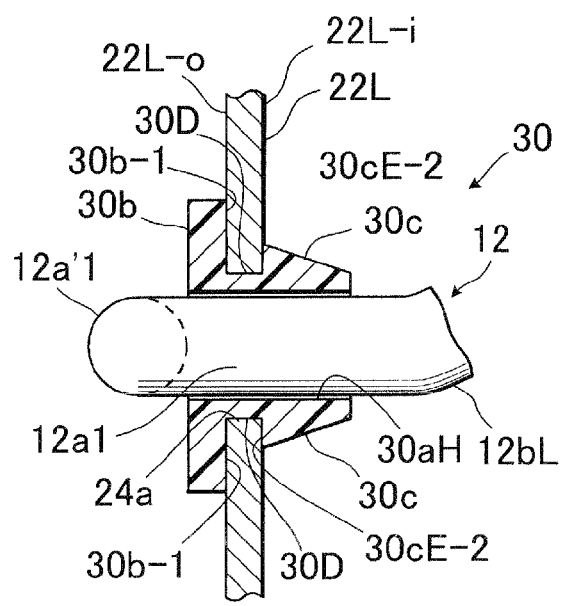
FIG. 6 is a fragmentary section view showing a principal part of the present invention.

(iii) Due to the characteristic structure of retainer bush (30) stated in the item (ii) above, the retainer bush (30) itself can be easily deformed and moved smoothly along the inverted-L-shaped connecting end portion (12aL or 12aR). And further, the retainer bush (30) can easily be secured fit in the circular hole region (24a) and contacted closely with the lateral frame member (22L or 22R), while bearing the first connecting end region (12a1 or 12a2) of crank rod member (12) in a rotatable manner. Namely, as best seen in FIG. 6, there is no clearance between the retainer bush's groove (30D) and the inner edge portion of that circular hole region (24a), and also there is no clearance between the retainer bush's flange portion (30b) and the lateral frame member's inner surface (22L-i or 22R-o). Therefore, the first connecting end region (12a1 or 12a2) is not only stably and rotatably supported by the retainer bush (30) without any of rattling and wobbling caused therein, but also precluded by that particular retainer bush (30) from direct keen contact with the circular hole region (24a), and further, the flange portion (30b) of retainer bush (30) precludes the second connecting end region (12a'1 or 12a'2) from direct contact with the lateral frame member's outer surface (22L-o or 22R-o). Still further, not to mention, the contact between the retainer bush and those first and second connecting end regions does not create any unpleasant or loud noise, since the retainer bush is made of synthetic resin or hard rubber material having soft and elastic surface. All those advantageous structure and arrangement of retainer bush (30) insure to prevent creation of any unpleasant noise from between the inverted-L-shaped connecting end portions (12aL and 12aR) and the lateral frame members (22L and 22R).

(iv) As understandable from FIGS. 1, 2(C) and 6, the two vertically extending second connecting end regions (12a'1) and (12a'2) extend across and adjacent to the respective two retainer bush flange portions (30b) and (30b). Hence, even if a lateral force is applied to the crank rod member (2) in one of left and right lateral directions (x) and (–x) as in FIG. 1, either of the two second connecting end regions (12a'1) (12a'2) immediately comes to contact with the corresponding one of the two flange portions (30b), thereby insuring to prevent the crank rod member (12) against lateral movement in either of the two lateral directions (x) and (–x), while avoiding creation of unpleasant or loud noise from the contact between the second connecting end region (12a'1 or 12a'2) and flange portion (30b) for the reason stated previously.

(v) The fact that the cylindrical body portion (30a) of the retainer bush (30) is tightly secured in the circular hole region (24a) is effective in preventing dislocation of the first connecting end regions (12a1 and 12a2) into the elongated hole region (24b) in the case where a normal load is applied to the crank rod member (12).

(vi) Even if an excessive great load is applied to the crank rod member (12), causing breakage of the retainer bush (30) and attempting to dislocate the first connecting end regions (12a1 and 12a2) into the elongated hole region (24b), both two inverted-L-shaped connecting end portions (12bL) and (12bR) are still prevented against removal from the respective two through-holes (24L) and (24R). This is because both two second connecting end regions (12a'1) (12a'2) are normally disposed at a side opposite to (or at substantially 180 degrees relative to) the elongated hole region (24b) and rotatable backwardly therefrom by the excessive great load (at L), as understandable in FIG. 3, toward a point indicated by the one-dot chain line, which is apparently angularly dislocated from a central line of the elongated hole region (24b). Further, in view of the limited oration range of crank rod member (12) in the seat back frame (22), each of the second connecting end regions (12a'1) (12a'2) will in no way be rotatable upwards to reach a point aligned with the elongated hole region (24b). Therefore, even if the two retainer bushes (30) and (30) are so broken and cut as to allow the first connecting end regions (12a1) and (12a2) to enter and move along the respective two elongated hole regions (24b) and (24b), both two second connecting end regions (12a'1) and (12a'2) are respectively maintained in contact with the two outer surfaces (22L-o) (22R-o) respectively of the left and right lateral frame members (22L) and (22R), while being maintained in an angular state relative to a central line of the elongated hole region (24b), whereby both left and right inverted-L-shaped connecting end portions (12aL) and (12aR) of crank rod member (12) are completely prevented against removal from the respective left and right through-holes (22L) and (22R).

While having described the present invention thus far, it should be understood that the invention is not limited to the illustrated embodiment, but any other modification, replacement and addition may be applied thereto without departing from the scope of the appended claims.

What is claimed is:

1. An arrangement for retaining a crank element rotatably between a first support element and a second support element in an automotive seat, in which said crank element has a first end and a second end, comprising:
   a first generally inverted-L-shaped end portion defined integrally in said first end of said crank element, said first generally inverted-L-shaped end portion being defined by bending said first end of said crank element in a generally inverted-L-shaped configuration so as to have, defined therein, a first end region extending horizontally from said first end of said crank element and a second end region extending at substantially a right angle from said first end region;
   a second generally inverted-L-shaped end portion defined integrally in said second end of said crank element, said second generally inverted-L-shaped end portion being defined by bending said second end of said crank element in a generally inverted-L-shaped configuration so as to have, defined therein, a first end region extending horizontally from said second end of said crank element and a second end region extending at substantially a right angle from said first end region;
   a first through-hole having an elongated hole region and a circular hole region communicating with said elongated hole region, wherein said elongated hole region has a width, whereas said circular hole region has a diameter larger than said width of said elongated hole region,
   wherein an entire length of said first through-hole, which corresponds to an entire length of said elongated and circular hole regions of said particular first through-hole, is larger than an entire length of said first and second end regions of said first inverted-L-shaped end portion, thereby allowing said particular first and second end regions to pass through said first through-hole,
   said first through-hole being formed in said first support element, such that said elongated hole region extends from said circular hole region in a first direction;
   a second through-hole having an elongated hole region and a circular hole region communicating with said elongated hole region, wherein said elongated hole region has a width, whereas said circular hole region has a diameter larger than said width of said elongated hole region,
   wherein an entire length of said second through-hole, which corresponds to an entire length of said elongated and circular hole regions of said particular second through-hole, is larger than an entire length of said first and second end regions of said second inverted-L-shaped end portion, thereby allowing said particular first and second end regions to pass through said second through-hole,
   said second through-hole being formed in said second support element, such that said elongated hole region extends upwardly from said circular hole region in a first direction;
   a first retainer bush element of a resilient property, said first retainer bush element having: a through-bore for allowing said first generally inverted-L-shaped end portion to be inserted and passed therethrough; and a groove portion for allowing said circular hole region of said first through-hole to be closely engaged therein;
   said first retainer bush element being disposed between said first end region of said first generally inverted-L-shaped end portion and said circular hole region of said first through-hole, in such a manner that said groove portion thereof is closely engaged with said circular hole region of said first through-hole, while allowing said first end region of said first generally inverted-L-shaped end portion to be rotatable in the through-bore thereof, with said second end region of said first generally inverted-L-shaped end portion extending from said circular hole region of said first through-hole in a second direction opposite to said first direction associated with said elongated hole region of said first through-hole;
   a second retainer bush element of a resilient property, said second retainer bush element having: a through-bore for allowing said second generally inverted-L-shaped end portion to be inserted and passed therethrough; and a groove portion for allowing said circular hole region of said second through-hole to be resiliently and closely engaged therein; and
   said second retainer bush element being disposed between said first end region of said second generally inverted-L-shaped end portion and said circular hole region of said second through-hole, in such a manner that said groove portion thereof is closely engaged with said circular hole region of said second through-hole, while allowing said first end region of said second generally inverted-L-shaped end portion to be rotatable in the through-bore thereof, with said second end region of said second generally inverted-L-shaped end portion extending from said circular hole region of said second through-hole in a second direction opposite to said first direction associated with said elongated hole region of said second through-hole.

2. The arrangement as claimed in claim 1, wherein each of said first and second retainer bush elements is so formed to have: one end portion; a cylindrical body portion having a circumferential outer surface; and at least two anchor portions, in such a manner that said at least two anchor portions are formed integrally on said circumferential outer surface of said cylindrical body portion in a spaced-apart relation with each other, while being spaced from said one end portion, thus defining at least two said grooves therebetween, and that said through-bore extends through said cylindrical body portion and said one end portion.

3. The arrangement according to claim 2, wherein said retainer bush element is formed from a synthetic resin material or a hard rubber material.

4. The arrangement as claimed in claim 2, wherein said cylindrical body portion has a first and a second end, wherein said first end portion comprises a flange portion radially extending from said first end of said cylindrical body portion, and wherein each of said at least two anchor portions is formed in such a configuration as to slope upwardly as it proceeds from said second end thereof towards said flange portion and terminates in a vertical wall spaced from said flange portion, so that said at least two grooves are each defined between said flange portion and said vertical wall of each of said at least two anchor portions.

5. The arrangement as claimed in claim 1, wherein said elongated hole region of each of said first and second through-holes also extends in a direction different from a direction in which said first end region of each of said first and second inverted-L-shaped end portion is to be displaced by a load applied to said crank element, and wherein, further, said particular elongated hole region is disposed at a point out of a range within which said second end region of each of said first and second inverted-L-shaped end portions is to be rotated relative to a center of said circular hole region of each of said first and second through-holes.

* * * * *